US010637865B2

(12) United States Patent
Hussain et al.

(10) Patent No.: US 10,637,865 B2
(45) Date of Patent: Apr. 28, 2020

(54) FAST HEARTBEAT LIVENESS BETWEEN PACKET PROCESSING ENGINES USING MEDIA ACCESS CONTROL SECURITY (MACSEC) COMMUNICATION

(71) Applicant: Juniper Networks, Inc., Sunnyvale, CA (US)

(72) Inventors: Baba Syed Mazaz Hussain, Bangalore (IN); Nikhil Gavraskar, Aurangabad (IN); Avinash Jayaprakash, Bangalore (IN); Sachin Mutalik Desai, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 284 days.

(21) Appl. No.: 15/785,252

(22) Filed: Oct. 16, 2017

(65) Prior Publication Data

US 2019/0116183 A1    Apr. 18, 2019

(51) Int. Cl.
*H04L 29/06* (2006.01)
*H04L 12/26* (2006.01)

(52) U.S. Cl.
CPC .............. *H04L 63/10* (2013.01); *H04L 43/10* (2013.01); *H04L 63/06* (2013.01); *H04L 63/061* (2013.01); *H04L 63/08* (2013.01); *H04L 63/0435* (2013.01); *H04L 63/12* (2013.01)

(58) Field of Classification Search
CPC ......... H04L 63/10; H04L 43/10; H04L 63/08; H04L 63/06
See application file for complete search history.

(56) References Cited

U.S. PATENT DOCUMENTS

| 2003/0158921 A1* | 8/2003 | Hare ........................ H04L 29/06 709/221 |
| 2007/0041327 A1* | 2/2007 | Foster .................. H04L 65/1043 370/242 |
| 2007/0217611 A1* | 9/2007 | Weis ................... G06Q 20/3829 380/277 |
| 2008/0022388 A1* | 1/2008 | Grewal ................. H04L 63/105 726/13 |

(Continued)

OTHER PUBLICATIONS

"Security Considerations and Proposals for MACsec key establishment" Brian Weis, May 15, 2006, pp. 1-18.*

(Continued)

*Primary Examiner* — Theodore C Parsons
*Assistant Examiner* — Thomas Ho
(74) *Attorney, Agent, or Firm* — Harrity & Harrity, LLP

(57) ABSTRACT

A device may include one or more processors to establish a media access control security (MACsec) key agreement (MKA) session between a first network device and a second network device via a MACsec link; establish a fast heartbeat session via the MACsec communication link, between a first packet processing engine of the first network device and a second packet processing engine of the second network device, to permit the first packet processing engine and the second packet processing engine to exchange fast heartbeat messages via the fast heartbeat session and the MACsec communication link; determine, based on the fast heartbeat session, that the MKA session has ended; and/or perform an action based on the MKA session ending.

20 Claims, 10 Drawing Sheets

(56) References Cited

U.S. PATENT DOCUMENTS

| | | | |
|---|---|---|---|
| 2008/0172582 A1* | 7/2008 | Sinicrope | H04L 63/164 714/48 |
| 2009/0217032 A1* | 8/2009 | Guan | H04L 63/08 713/154 |
| 2011/0296044 A1* | 12/2011 | Weis | H04L 43/0811 709/230 |
| 2014/0258532 A1* | 9/2014 | Weis | H04L 43/0811 709/225 |
| 2015/0207793 A1 | 7/2015 | Mohamed et al. | |
| 2017/0104851 A1 | 4/2017 | Arangasamy et al. | |
| 2017/0235492 A1* | 8/2017 | Liu | G06F 3/061 711/165 |
| 2018/0302269 A1* | 10/2018 | Sankaran | H04L 63/061 |
| 2019/0281031 A1* | 9/2019 | Pothula | H04L 9/0838 |

OTHER PUBLICATIONS

Overview of IEEE 802.1X-REV Dynamic Session Key Agreement, Brian Weis, teaches the IEEE standard of the MACsec key agreement.*

"Port-Based Network Access control" IEEE 802.1x-2010, pp. 60-78 teach the IEEE standard for MKA key agreement within the MACsec protocol.*

* cited by examiner

FAST HEARTBEAT LIVENESS BETWEEN PACKET PROCESSING ENGINES USING MEDIA ACCESS CONTROL SECURITY (MACSEC) COMMUNICATION

BACKGROUND

Media access control security (MACsec) is a security standard, defined by the Institute of Electrical and Electronics Engineers (IEEE) 802.1AE, that defines connectionless data confidentiality and integrity for media access independent protocols. The MACsec standard specifies a set of protocols to meet security requirements for protecting data traversing Ethernet local area networks (LANs). MACsec allows unauthorized LAN connections to be identified and excluded from communication within the network, and defines a security infrastructure to provide data confidentiality, data integrity, and data origin authentication.

SUMMARY

According to some implementations, a device may include one or more processors to establish a media access control security (MACsec) key agreement (MKA) session between a first network device and a second network device via a MACsec link; establish a fast heartbeat session via the MACsec communication link, between a first packet processing engine of the first network device and a second packet processing engine of the second network device, to permit the first packet processing engine and the second packet processing engine to exchange fast heartbeat messages via the fast heartbeat session and the MACsec communication link; determine, based on the fast heartbeat session, that the MKA session has ended; and/or perform an action based on the MKA session ending According to some implementations, a non-transitory computer-readable medium may store instructions that, when executed by one or more processors, cause the one or more processors to establish an media access control security (MACsec) key agreement (MKA) session between a first network device and a second network device via a MACsec communication link to send MKA packet data; establish a fast heartbeat session via the MACsec communication link between a first packet processing engine of the first network device and a second packet processing engine of the second network device to permit the first packet processing engine and the second packet processing engine to exchange fast heartbeat messages via the fast heartbeat session and the MACsec communication link at a faster rate than MKA packet data of the MKA session; determine, based on the fast heartbeat session, that the first network device or the second network device has been disconnected from the MKA session; and/or perform an action based on the determining that the first networked device or the second network device has been disconnected from the MKA session.

According to some implementations, a method may include establishing an media access control security (MACsec) key agreement (MKA) session between a first network device and a second network device via a MACsec communication link; establishing a fast heartbeat session via the MACsec communication link between a first packet processing engine of the first network device and a second packet processing engine of the second network device to permit the first packet processing engine and the second packet processing engine to exchange fast heartbeat messages via the fast heartbeat session and the MACsec communication link; determining, based on the fast heartbeat session, that the first network device or the second network device has been disconnected from the MKA session; and/or reinitiating an exchange of MKA packet data via the MKA session based on determining that the first network device or the second network device has been disconnected from the MKA session.

DETAILED DESCRIPTION

Figure 1A:
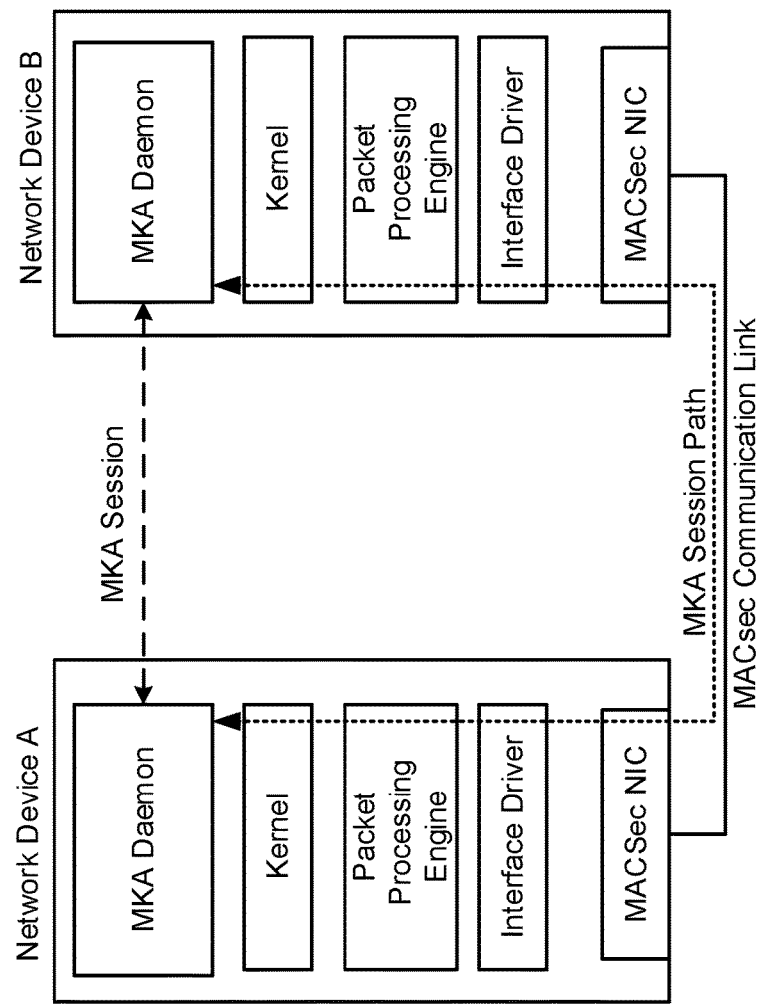
FIGS. 1A-1D are diagrams of an overview of an example implementation described herein.

The following detailed description of example implementations refers to the accompanying drawings. The same reference numbers in different drawings may identify the same or similar elements.

In a media access control security (MACsec) key agreement (MKA) protocol, at least two peer devices may communicate via an MKA session over a MACsec communication link. In such MKA sessions, peer liveness or availability may be monitored via peer liveness messages (e.g., heartbeat messages) exchanged between MKA daemons of MKA devices at a regular transmit interval (e.g., two or more seconds). In some instances, the MKA protocol may implement a timeout interval for MKA sessions (e.g., an interval approximately two times or three times the transmit interval) to wait for peer liveness or availability before determining that the peer has been disconnected from the MACsec communication link. Accordingly, in many instances, such a delay before detecting that a peer has been disconnected from a MACsec communication link may result in delays in network convergence, communication failure, packet data loss, traffic blackholing, and/or the like for extended periods of time. Furthermore, the peer liveness messages may not be transmitted through a control channel of a MACsec communication link of the MKA session. Accordingly, secure keys programmed in MACsec devices may not be validated by the peer liveness messages and a device may include expired entries, due to failures, for an extended period of time. In some systems, where MKA sessions are held on a relatively large number of ports (e.g., more than 40 ports), responsiveness of the control plane may decrease due to the high scale. Further, increasing the transmit intervals using standard peer liveness messages between MKA daemons of MKA devices to address these issues may cause failures as a control plane of the MKA session may not be able to handle the increased load.

Some implementations, described herein, provide a fast heartbeat protocol to be performed during an MKA session between packet processing engines of MKA devices, rather than between MKA daemons at the top of a stack of elements of MKA devices. The fast heartbeat protocol messages may be exchanged between MKA devices at a faster rate than the standard peer liveness messages of MKA sessions (e.g., approximately every half second (0.5 seconds)). Additionally, in some instances, the fast heartbeat protocol may lessen a period of time for peer liveness messages (referred to herein as fast heartbeat messages) to reach peer MKA devices as the packet processing engines may be located closer to a network interface control (NIC) in the stack of the MKA devices, and thus may be closer to the "outside world," than the MKA daemons of the MKA devices. Additionally, or alternatively, a fast heartbeat timeout interval may be implemented to be less than a period of time of an MKA timeout interval of MKA sessions. In some implementations, the fast heartbeat messages may be transmitted as controlled packets through the secured channels of MACsec (and thus may not need to be encrypted/decrypted because the fast heartbeat messages are sent or received via the secured channels of MACsec), thus ensuring that the secure path is validated and there is no overhead for encrypting frames (unlike standard MKA packet data units (PDUs)).

Accordingly, some implementations herein enable faster detection of a disconnection between MKA devices during an MKA session over previous techniques, thus preventing packet loss, traffic blackholing, device errors/failures, and/or processing downtime, and therefore, conserving network resources. Furthermore, some implementations herein provide for frequent validation of a MACsec communication link as fast heartbeat messages are exchanged via secured channels of the MACsec communication link, thus validating the secure channels of the MACsec communication link each time a fast heartbeat message is received, thus indicating a liveliness of the network devices of the MKA session. Accordingly, some implementations described herein may prevent exchanging data through an unvalidated MACsec communication link (e.g., if keys are missing, expired, unprogrammed, and/or the like), thus preventing packet loss, traffic blackholing, and/or the like.

As used herein, a packet may refer to a communication structure for communicating information, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

As used herein, network traffic or traffic may refer to information communicated using a communication structure, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

FIGS. 1A-1D are diagrams of an overview of an example implementation 100 described herein. Example implementation 100 shows a network device A and a network device B in communication via a MACsec communication link. As shown in FIGS. 1A-1D, network device A and network device B each includes an MKA stack. In the example implementation 100 of, the MKA stacks of network device A and network device B each include an MKA daemon, a kernel, a packet processing engine, an interface driver, and a MACsec network interface controller (NIC).

In the MKA stack of the example implementation 100 of FIGS. 1A-1D, the MKA daemon includes a process or program operating in the background of the network device to exchange MKA communications with MKA enabled devices. The kernel includes a program that operates to translate packet data between the packet processing engine and the MKA daemon. The packet processing engine performs packet switching and/or routing of MKA packet data, such as extensive authentication protocol over local area network (EAPoL) packets. The interface driver serves as a software interface between the MACsec NIC and network device/packet processing engine. The MACsec NIC serves as the hardware interface between the network device and a network.

In example implementation 100, data may be exchanged via an MKA session path. As shown in FIGS. 1A-1D, the MKA session path is between MKA daemons of network device A and network device B and goes through each element in the MKA stacks (e.g., the MACsec NIC, the interface driver, the packet processing engine, and the kernel) of network device A and network device B.

As shown in FIG. 1A and by reference number 110, an MKA session may be established between network device A and network device B. During the MKA session, MKA peer liveness messages may be sent periodically between the MKA daemons (e.g., every 2 seconds or more) via the MKA session path.

Figure 1B:
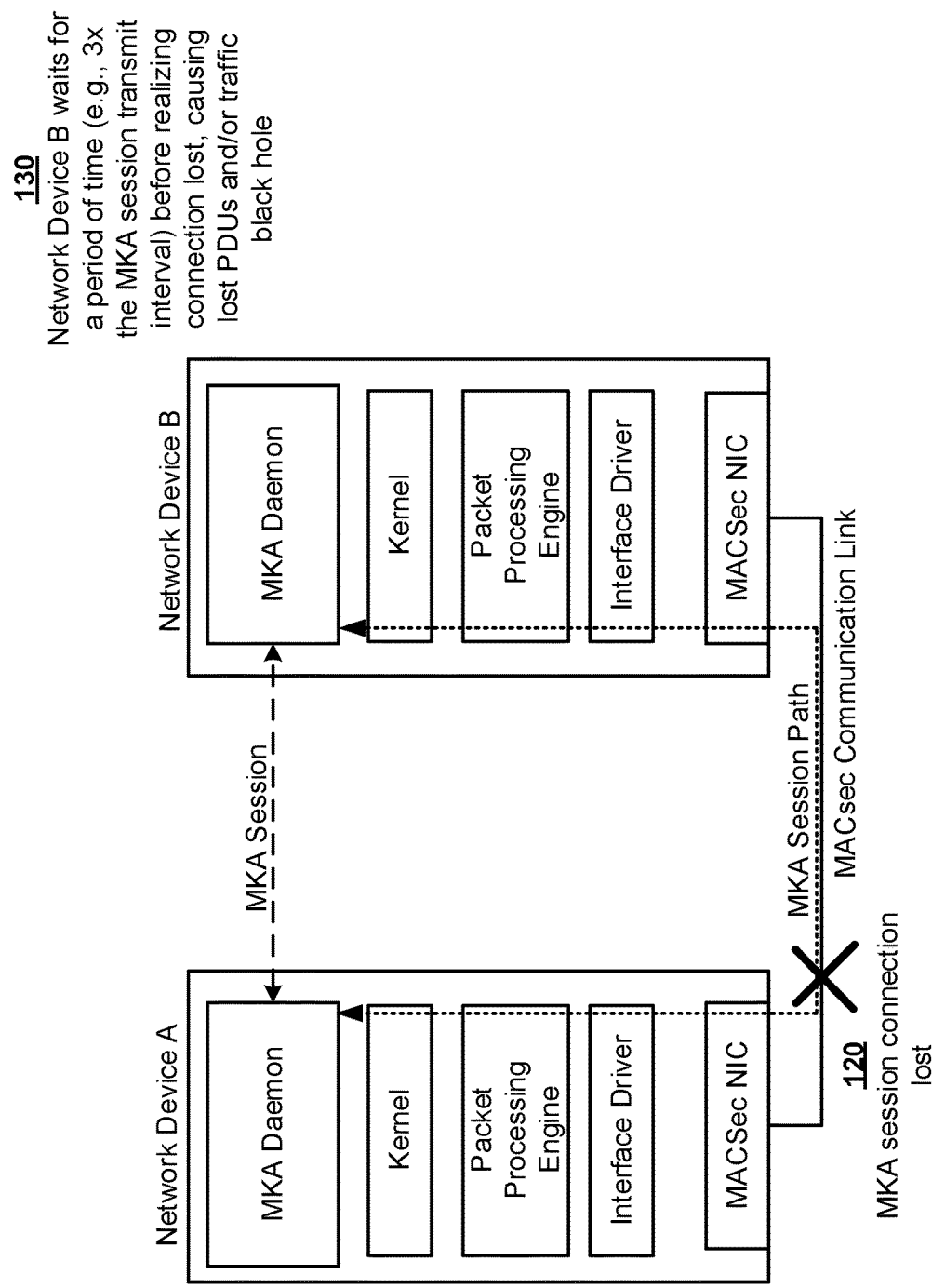

As shown in FIG. 1B and by reference number 120, the MKA session connection may be lost. For example, network device A may become disconnected from the MACsec communication link, may experience a failure or shutdown, and/or the like that results in an MKA session connection being lost. As shown by reference number 130, network device B may wait for an extended period of time (e.g., three times the MKA session transmit interval) before realizing that the connection has been lost, resulting in lost packet data and/or traffic blackholing.

Figure 1C:
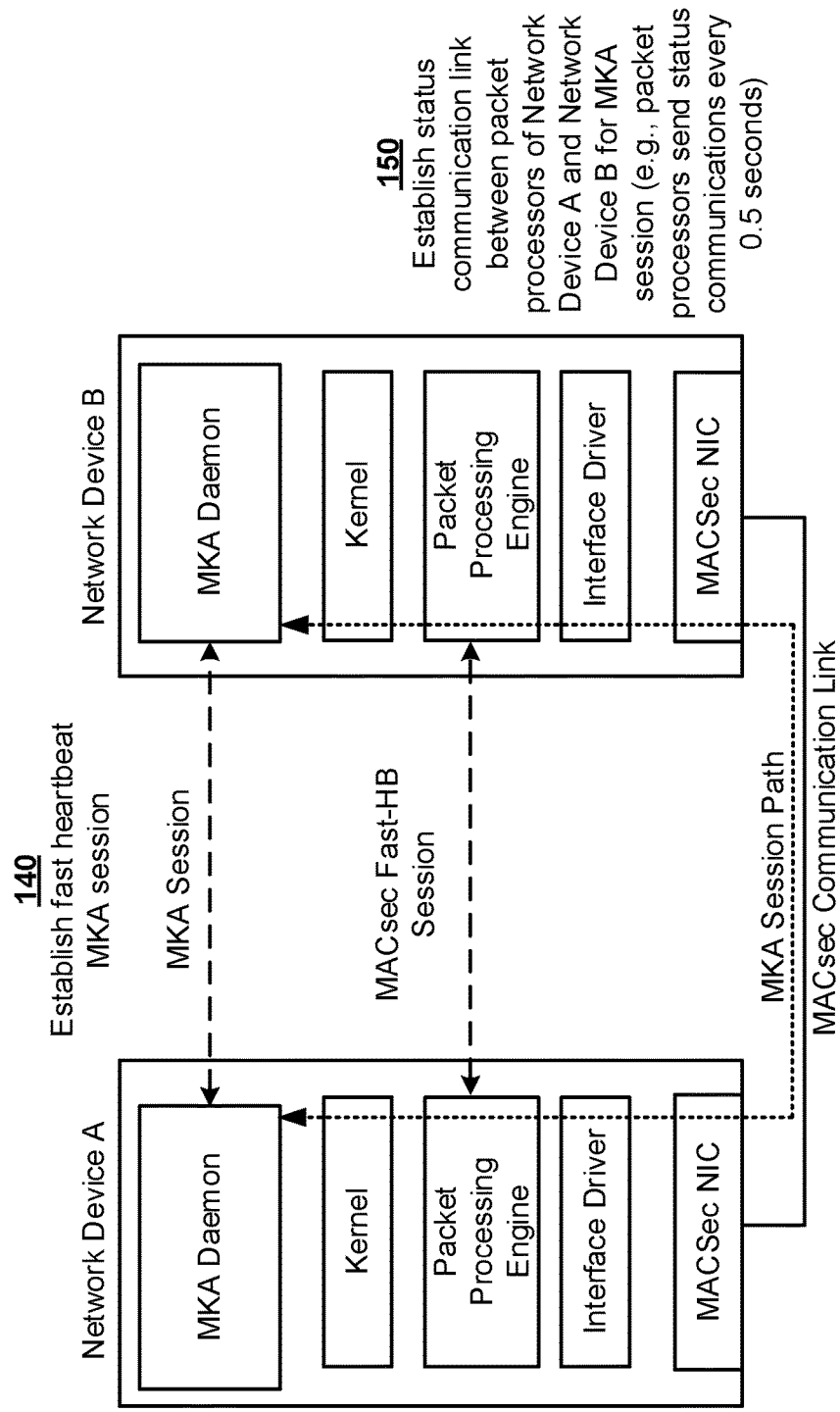

As shown in FIG. 1C and by reference number 140, a fast heartbeat MKA session is established between the network device A and the network device B (e.g., after the MKA session is established). In the fast heartbeat MKA session, as shown by reference number 150, the fast heartbeat protocol of the MKA session establishes a fast heartbeat communication link between the packet processing engines of network device A and network device B for the MKA session. For example, the packet processing engines may send fast heartbeat messages at a fast heartbeat exchange interval (e.g., every 0.5 seconds) that is less than an exchange interval between sending MKA packet data in the MKA session.

Figure 1D:
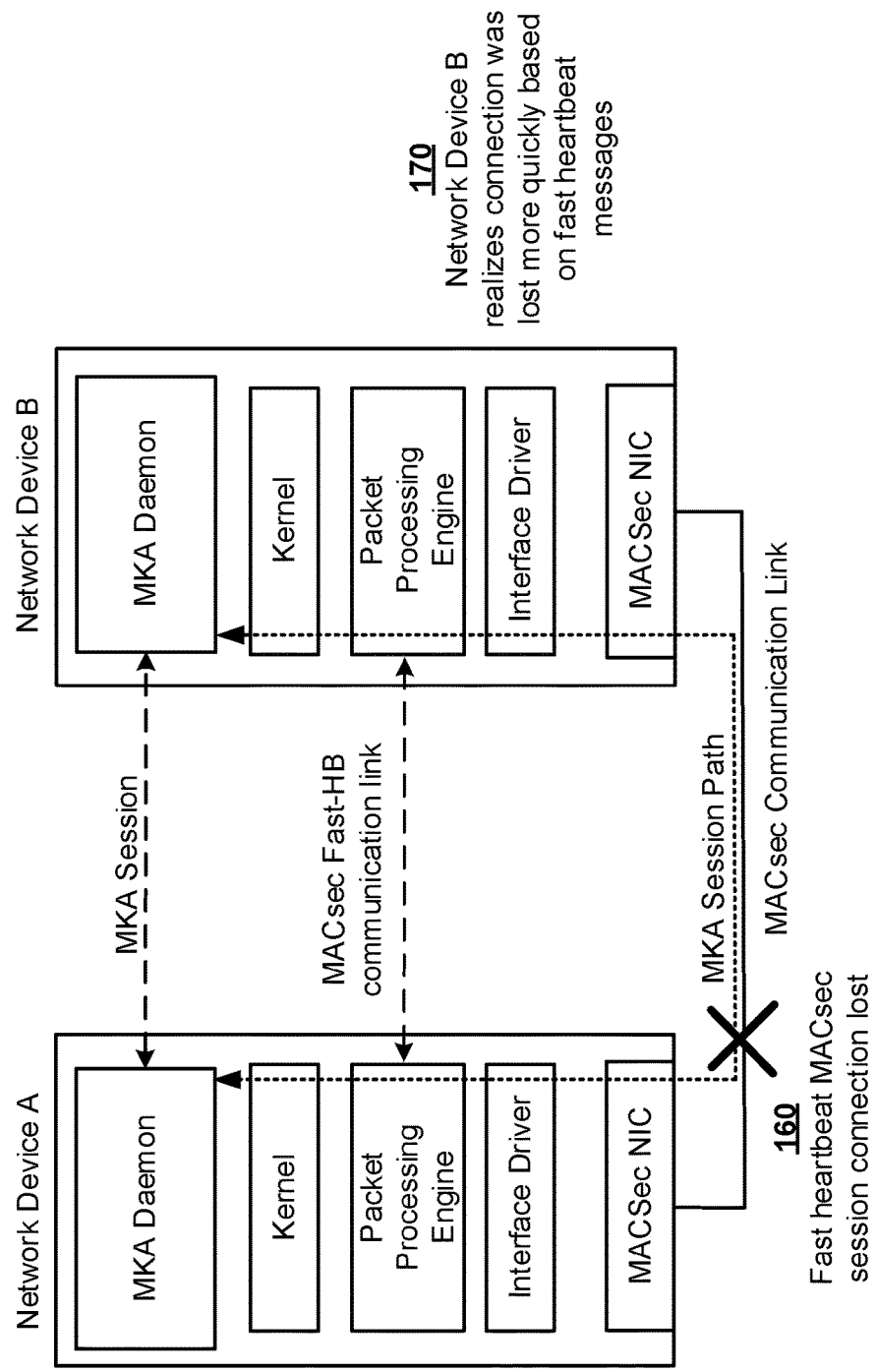

As shown in FIG. 1D, and by reference number 160, the fast heartbeat MACsec session connection may be lost. As shown by reference number 170, due to the faster rate of exchanging fast heartbeat messages and the proximity of packet processing engines to the MACsec NICs of the network device A and network device B, network device B realizes that the connection was lost more quickly based on the packet processing engines exchanging fast heartbeat messages.

Accordingly, network device B, in the example implementation 100 of FIGS. 1C and 1D may preserve network resources by ceasing stopping an exchange of (e.g., transmitting, receiving, and/or waiting for receipt of) MKA packet datapacket data to network device A, thus avoiding expending network resources on packet loss and/or traffic blackholing.

As indicated above, FIGS. 1A-1D are provided merely as an example. Other examples are possible and may differ from what was described with regard to FIGS. 1A-1D.

Figure 2:
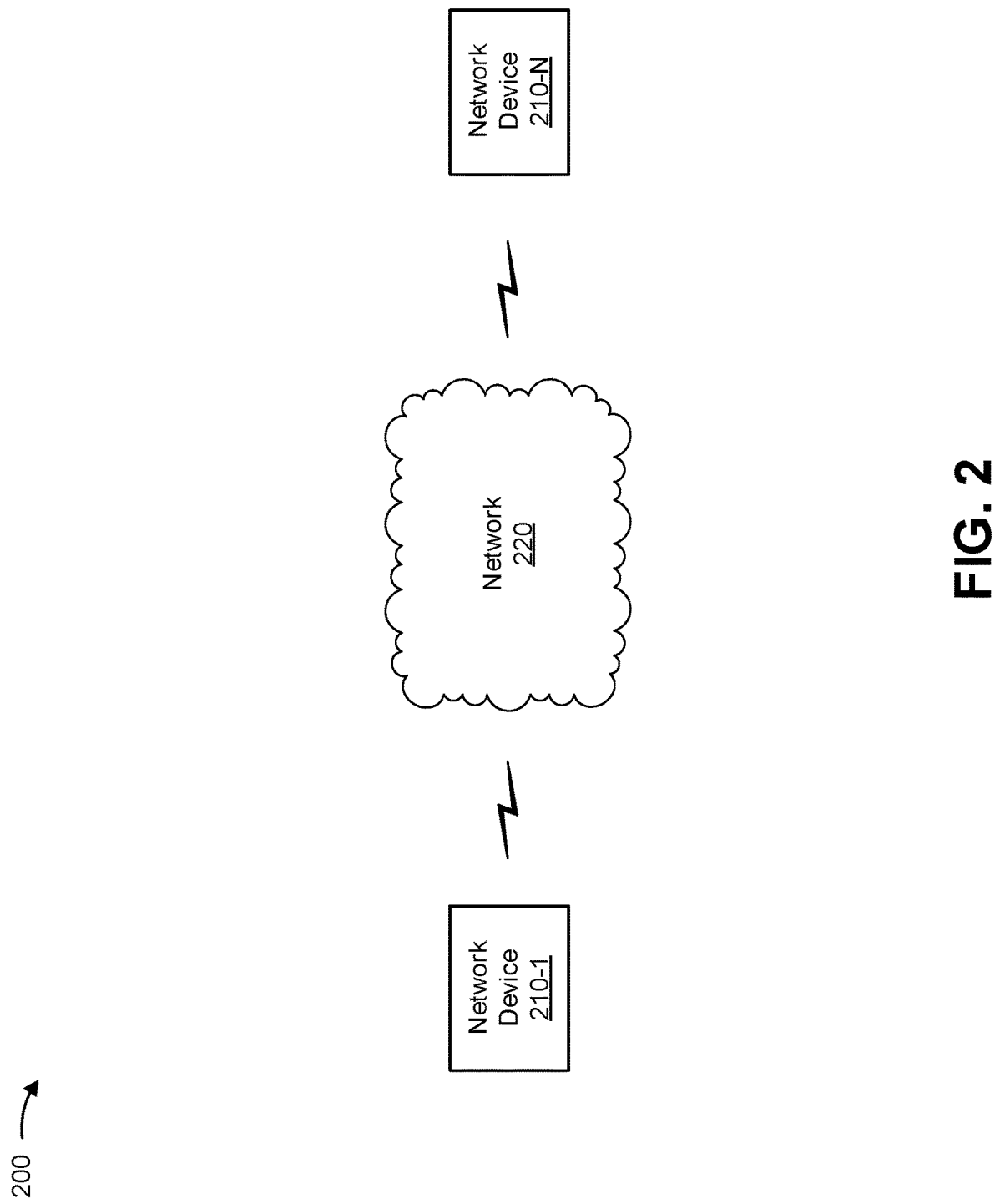
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-N (N≥1) (hereinafter referred to collectively as "network devices 210," and individually as "network device 210") and a network 220. Devices of environment 200 may interconnect via wired connections, wireless connections, or a combination of wired and wireless connections.

Network device 210 includes one or more devices (e.g., one or more traffic transfer devices) capable of processing and/or transferring network traffic. For example, network device 210 may include a firewall, a router, a gateway, a switch, a hub, a bridge, a reverse proxy, a server (e.g., a proxy server), a security device, an intrusion detection device, a load balancer, or a similar device. According to some implementations herein, network device 210 is capable of communicating with other network devices 210 via MKA sessions, as described herein.

In some implementations, network device 210 may be a physical device implemented within a housing, such as a chassis. In some implementations, network device 210 may be a virtual device implemented by one or more computer devices of a cloud computing environment or a data center.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
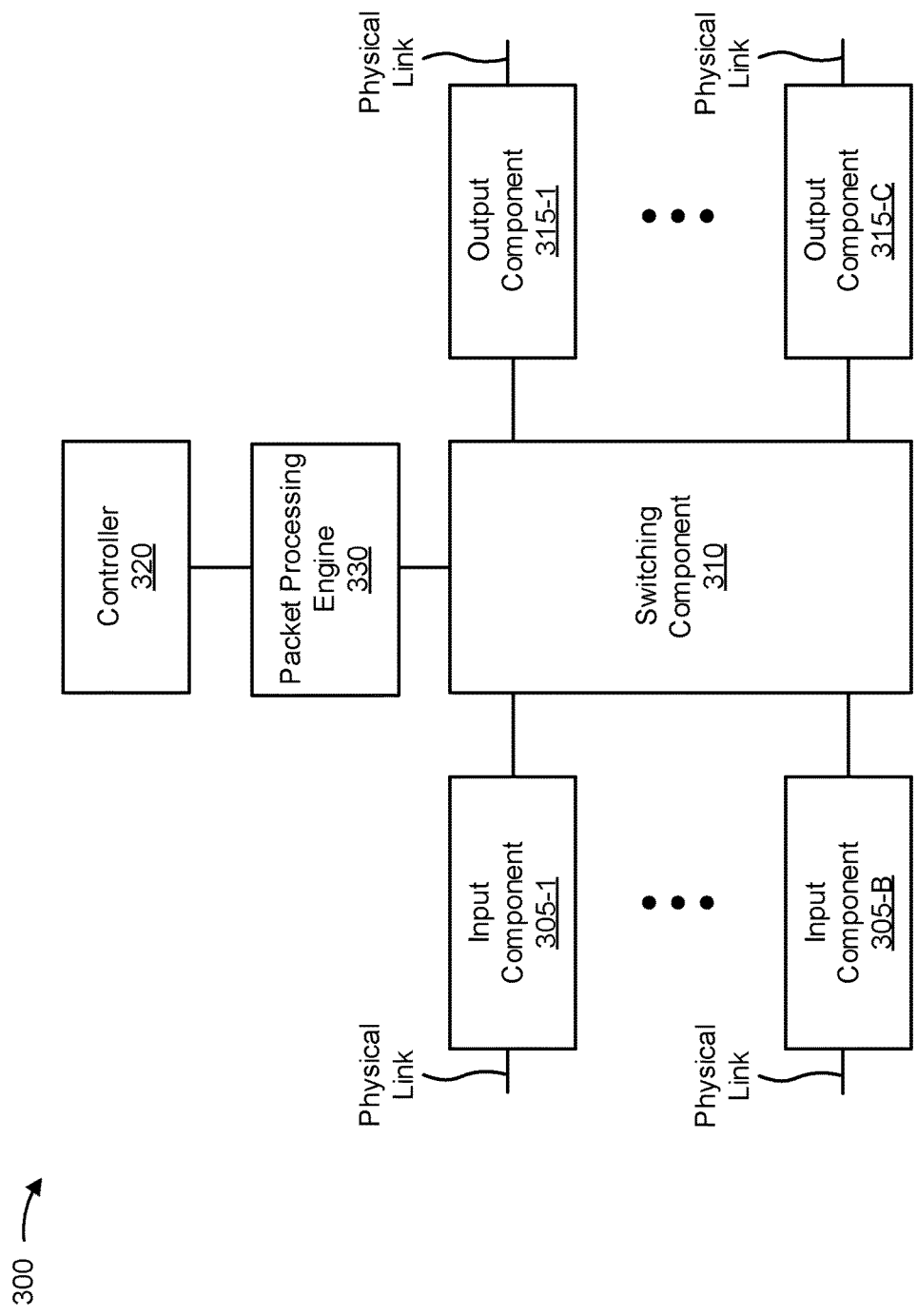
FIG. 3 is a diagram of example components of one or more devices of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), a controller 320, and a packet processing engine 330.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. A processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

Packet processing engine 330 may perform packet switching and/or routing of packet data units. For example, packet processing engine 330 may perform packet switching and/or routing of MKA packet data (e.g., EAPoL packet data). Packet processing engine 330 may perform Layer 2 and Layer 3 packet switching. Packet processing engine As shown in FIG. 3, Packet processing engine 330 is connected with switching component 310 (e.g., via a physical interface card (PIC)). In some implementations, packet processing engine 330 may be implemented by or collocated with controller 320, a line card, input components 305, switching component 310, and/or output components 315.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
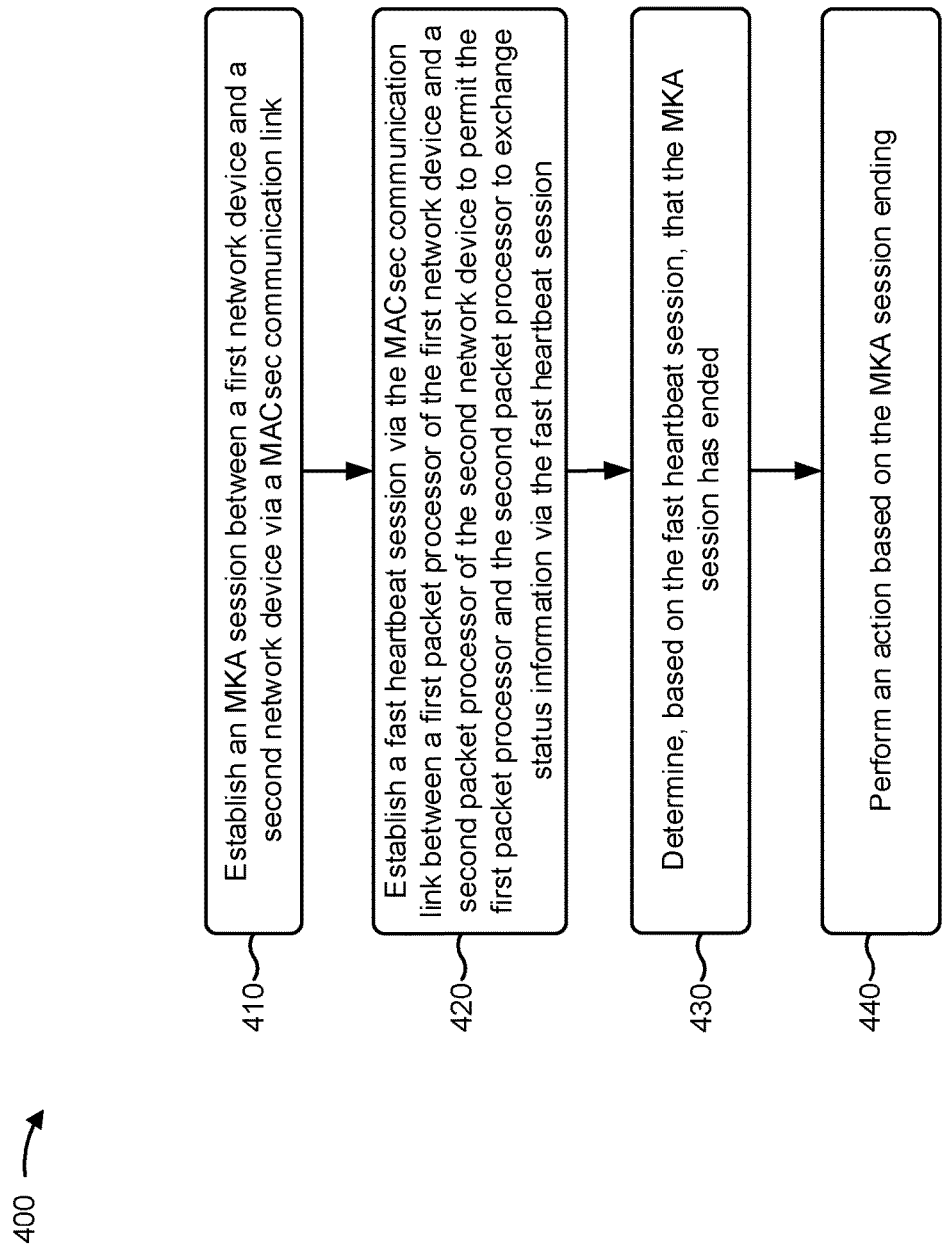
FIG. 4 is a flow chart of an example process for establishing a fast heartbeat session between packet processing engines of network devices using media access control security (MACsec) communication.

FIG. 4 is a flow chart of an example process 400 for establishing a fast heartbeat session between packet processing engines of network devices using media access control security (MACsec) communication. In some implementations, one or more process blocks of FIG. 4 may be performed by network device 210-1. In some implementations, one or more process blocks of FIG. 4 may be performed by another device or a group of devices separate from or including network device 210-1, such as another network device 210 or another device in communication with network 220.

As shown in FIG. 4, process 400 may include establishing an MKA session between a first network device and a second network device via a MACsec communication link (block 410). For example, network device 210-1 may establish the MKA session between network device 210-1 and network device 210-N. In some implementations, network device 210-1 may establish the MKA session based on an event or trigger to cause an exchange of data via an MKA session, based on a user input (e.g., request to exchange data), based on the network device 210-1 being placed in communication with network device 210-N, and/or the like.

In some implementations, as described herein, an MKA session is a communication session that exchanges MKA packet data, such as EAPoL packet data. The PDUs may include context specific information, such as message number, member identification (ID), packet identification number (PIN), and/or the like. A periodic exchange of the MKA packet data keeps the MACsec communication link in tact until a timeout occurs (e.g., a time period during which MKA packet data are not exchanged between the network devices 210). Because the MACsec communication link is a secure communication link, network devices 210 that exchange MKA packet data via the secure communication link may not encrypt the MKA packet data.

During MKA sessions, MKA packet data may ingress network device 210-1 via a stack to reach an MKA daemon. For example, MKA packet data may ingress network device 210-1 via a MACsec NIC, continue through an interface driver, a packet processing engine, and/or a kernel to reach the MKA daemon, which may respond with MKA packet data back through the stack that egress from the MACsec NIC to another network device 210-N.

In some implementations, network device 210-1 may establish the MKA session using MKA protocol messages. For example, network device 210-1 may exchange a series of MKA protocol messages with network device 210-N.

In this way, network device 210-1 may establish an MKA session via a MACsec communication link, which may enable network device 210-1 to establish a fast heartbeat session via the MACsec communication, link, as described below.

As further shown in FIG. 4, process 400 may include establishing a fast heartbeat session via the MACsec communication link between a first packet processing engine of the first network device and a second packet processing engine of the second network device to permit the first packet processing engine and the second packet processing engine to exchange fast heartbeat messages via the fast heartbeat session (block 420). For example, network device 210-1 may establish the fast heartbeat session between a packet processing engine 330 of network device 210-1 and a packet processing engine 330 of network device 210-N. In some implementations, network device 210-1 may establish the fast heartbeat session based on the MKA session being established.

Established by sending the fast heartbeat message, receiving a reply, being configured to send or receive fast heartbeat messages, etc.

In some implementations, the fast heartbeat session exchanges fast heartbeat messages at an increased rate relative to the exchange of MKA packet data of the MKA session. For example, the fast heartbeat session may involve network devices 210 exchanging fast heartbeat messages at a fast heartbeat exchange interval of at least every half second (e.g., every 0.5 seconds, at a rate faster than every 0.5 seconds, etc.) via packet processing engines 330, while the MKA session may involve network devices 210 exchanging MKA packet data every two seconds. As used herein, the length of time between sending, receiving, or exchanging fast heartbeat messages may be referred to as a fast heartbeat exchange interval.

In some implementations, network devices 210 may send out fast heartbeat messages at a layer lower than the MKA daemon in the MKA stack (e.g., from the kernels, the packet processing engines, the interface drivers, or the MACsec NICs of network devices 210). In some implementations, the fast heartbeat messages may be sent by the packet processing engines of network devices 210. In some implementations, the fast heartbeat messages may be sent via a fast heartbeat session. In some implementations, the fast heartbeat session may utilize a secure channel of the MACsec communication link. Accordingly, network devices 210 may use the fast heartbeat messages to validate the secure channel without any overhead of encrypting fast heartbeat messages or data to/from layers of the stack higher than the packet processing engine 330 (e.g., an MKA daemon or kernel), thus conserving resources of network devices 210. In some instances, MKA packet data may not be used to validate a secure channel as the MKA packet data may not be exchanged via a secure channel of the MACsec communication link.

During a fast heartbeat session, packet processing engines 330 of network devices 210 may synchronously or asynchronously transmit fast heartbeat messages. The fast heartbeat messages may include message frames. For example, the message frames may include a destination address field, a source address field, an ether type field, a frame type field, a length field, a secure channel identifier (SCI) field, a member identifier field, a member number field, and/or a connectivity association key (CAK) name (CKN) field (as further described below).

In some implementations, network device 210-1 may establish the fast heartbeat session based on an MKA timeout interval being reached. For example, when MKA packet data has not been received by network device 210-1 after an MKA timeout interval (e.g., over two seconds, over 6 seconds), network device 210-1 may establish the fast heartbeat session.

In some implementations, network device 210-1 may establish or end the fast heartbeat session based on a status of an MKA session. For example, if the MKA session exchanges MKA packet data at an established interval (e.g., every two seconds) for a period of time, then network device 210-1 may end or deactivate the fast heartbeat session for the MKA session. Network device 210-1 may then reestablish the fast heartbeat session if MKA packet data are not received at the established interval for a period of time (e.g., by resending fast heartbeat messages). Accordingly, network device 210-1 may be triggered to establish the fast heartbeat session based on not receiving data of the MKA session (or data on the MACsec communication link).

In this way, network device 210-1 may establish a fast heartbeat session, which enables packet processing engines 330 of the network devices 210 to exchange fast heartbeat messages at an increased rate relative to MKA packet data of the MKA session.

As further shown in FIG. 4, process 400 may include determining, based on the fast heartbeat session, that the MKA session has ended (block 430). For example, network device 210-1 may determine that the MKA session has ended based on the fast heartbeat messages. In some implementations, network device 210-1 may determine that the MKA session has ended based on a length of time (e.g., a fast heartbeat timeout interval) expiring without receiving a fast heartbeat message.

In some implementations, network device 210-1 may wait for a fast heartbeat timeout interval to expire before determining an MKA session has ended. For example, the fast heartbeat timeout interval may be calculated as a multiple of the fast heartbeat exchange interval (e.g., based settings of network devices 210, based on a standard). Accordingly, network device 210-1 may use a fast heartbeat timeout factor to calculate the fast heartbeat timeout interval as shown in Equation 1.

$$\text{Fast Heartbeat Timeout Interval} = \text{Fast Heartbeat Exchange Interval} \times \text{Timeout Factor} \quad (1)$$

In some implementations, the fast heartbeat timeout factor may be set by network devices 210, determined by a standard, and/or the like.

In some implementations, the MKA session may end due to an event, such as network device 210-1 being instructed to end the MKA session, network device 210-1 being disconnected from MACsec communication link, network device 210-1 experiencing a failure, network device 210-1 shutting down, and/or the like. For example, due to one or more of the events described above, network device 210-N may not be available to continue an MKA session. Therefore, when network device 210-N stops sending fast heartbeat messages, network device 210-1 may determine that the MKA session between network device 210-1 and network device 210-N has ended.

In this way, network device 210-1 may determine that an MKA session has ended based on the fast heartbeat messages.

As further shown in FIG. 4, process 400 may include performing an action based on the MKA session ending (block 440). For example, network device 210-1 may perform the action. In some implementations, network device 210-1 may perform the action based on the MKA session ending.

In some implementations, network device 210-1 may reinitiate the MKA session (e.g., by resending MKA session messages to the other network device 210-N). According to some implementations, network device 210-1 may perform an action to stop sending MKA session data (e.g., the data is prevented from being sent until an MKA session is re-established) and/or fast heartbeat messages (e.g., to avoid the MKA packet data from being lost or blackholed), thereby conserving network resources of network device 210-1. Additionally, or alternatively, network device 210-1 may perform an action including sending a notification to the other network device 210-1 of the MKA session notifying the other network device 210-N of the disconnection, thereby conserving network resources of the other network device 210-1. Additionally, or alternatively, network device 210-1 may perform an action including attempting to reestablish the MKA session with the other network device 210-N of the MKA session and/or with a different network device 210 than the other network device 210-N of the MKA session. In some implementations, network device 210-1 may perform an action including notifying a network operator of the MKA session ending. Additionally, or alternatively, network device 210-1 may perform an action including logging information associated with the session ending in a log (e.g. for MKA sessions of network device 210-1). Additionally, or alternatively, network device 210-1 may perform an action including commencing trouble shooting. In some implementations, network device 210-1 may reboot and/or cause another network device 210-N to reboot.

In this way, network device 210-1 may perform an action associated with identifying the MKA session ending using the fast heartbeat messages, including one or more actions to preserve network resources and/or prevent packet loss and traffic blackholing, as described herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
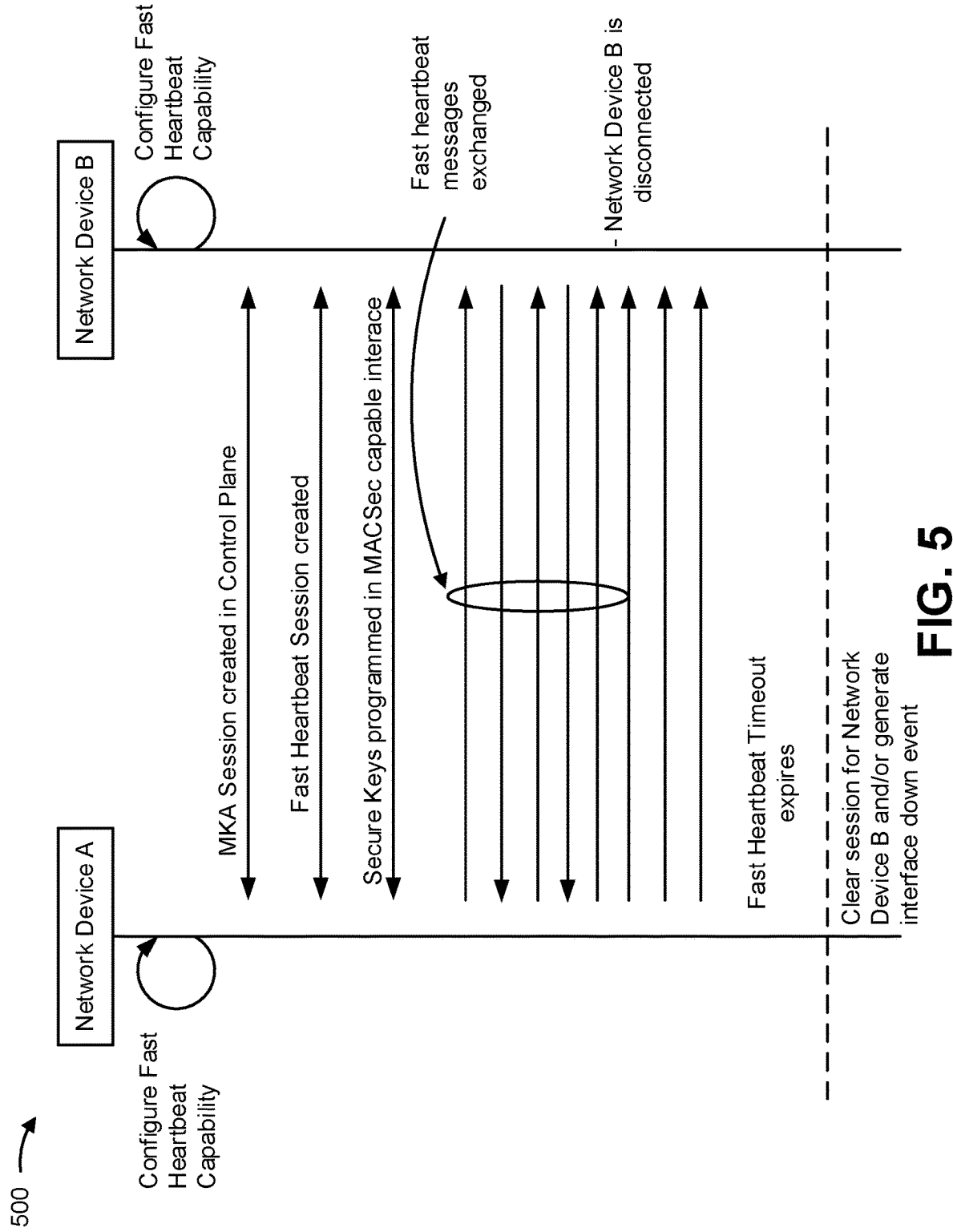
FIG. 5 is a call flow of an example implementation relating to the example process shown in FIG. 4.

FIG. 5 shows an example of a call flow of an example implementation relating to the example process shown in FIG. 4. The example call flow of FIG. 5 may be used in establishing a fast heartbeat session between packet processing engines of network devices 210 using media access control security (MACsec) communication.

As shown in FIG. 5, example implementation 500 may include network device A and network device B. In example implementation 500, network device A may be an initiating device (e.g., a network device requesting to establish an MKA session). As shown in FIG. 5, network device A and network device B configure or are configured with fast heartbeat capability (e.g., packet processing engines of network device A and network device B are configured to exchange fast heartbeat messages with other network devices via a fast heartbeat session), as described herein. As further shown in FIG. 5, network device A and network device B may exchange messages to create an MKA session in the control plane (e.g., via a MACsec communication link). As further shown in FIG. 5, network device A and network device B may exchange messages to create a fast heartbeat session. As further shown in FIG. 5, network device A and network device B may exchange secure keys programmed in a MACsec capable interface (e.g., MACsec interface drivers) of network device A and network device B.

As further shown in FIG. 5, network device A and network device B may exchange fast heartbeat messages. For example, network device A may send a first fast heartbeat message, and network device B may reply with a second fast heartbeat message based on network device B receiving the first fast heartbeat message. Additionally, or alternatively, network device B may send a first fast heartbeat message, and network device A may reply with a second fast heartbeat message based on network device A receiving the first fast heartbeat message. In various implementations, the fast heartbeat messages may be synchronous or asynchronous. In some implementations, an interval of time may start and/or stop based on network device A or network device B sending and/or receiving fast heartbeat messages.

As further shown in FIG. 5, network device B may stop sending fast heartbeat messages, while network device A continues to send fast heartbeat messages (e.g., due to network device B becoming disconnected from the MKA session). In this case, network device A may determine that an MKA session has ended (e.g., after the fast heartbeat timeout expires). As shown, network device A may clear the session for network device B and/or generate an interface down event (e.g., to shutdown the driver interface of the MKA stack and/or general traffic of network device A).

As indicated above, FIG. 5 is provided merely as an example. Other examples are possible and may differ from what was described with regard to FIG. 5.

Figure 6:
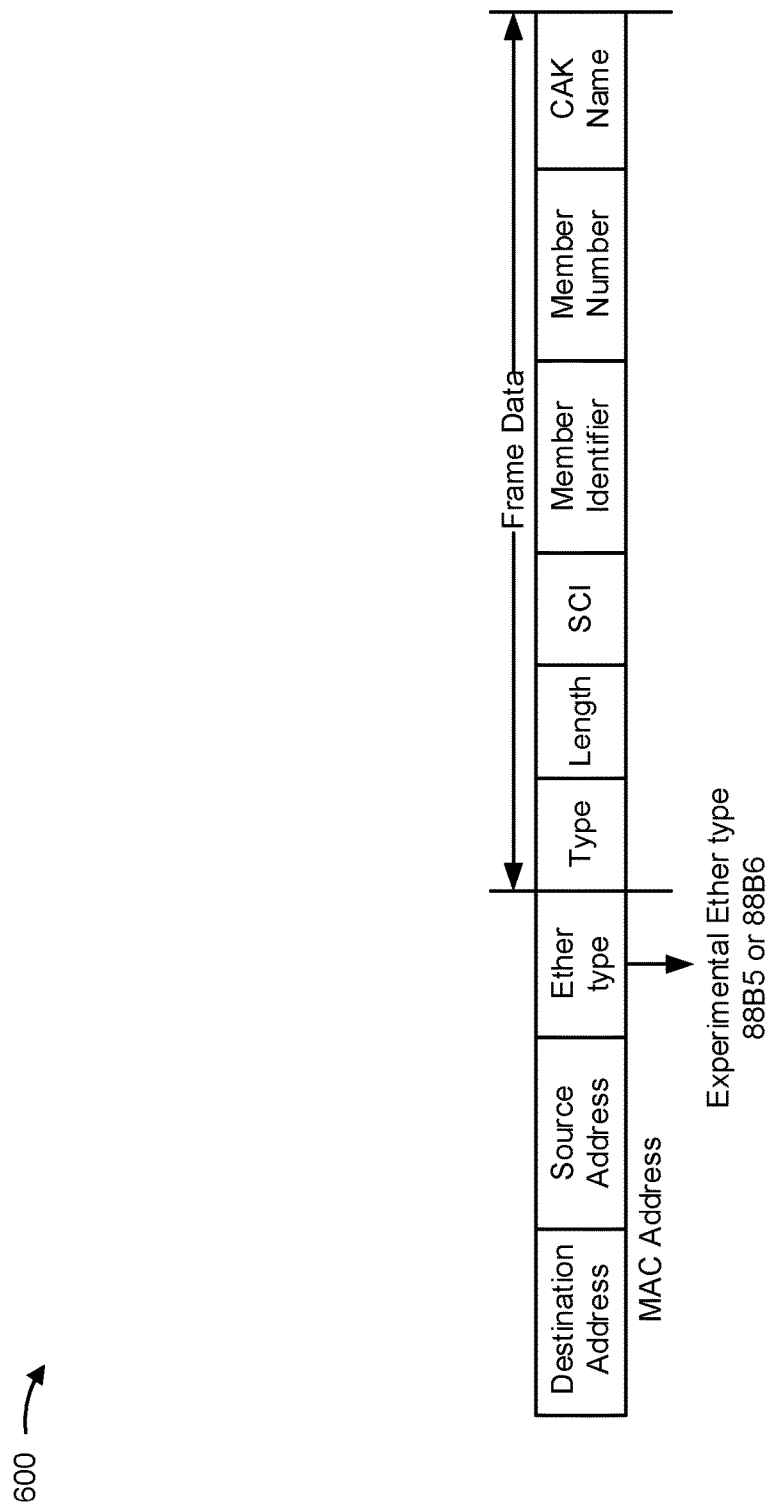
FIG. 6 is a diagram of an example implementation relating to the example process shown in FIG. 4.

FIG. 6 is a diagram of an example implementation 600 relating to example process 400 shown in FIG. 4. FIG. 6 shows an example implementation of packet datafor establishing a fast heartbeat session between packet processing engines of network devices using media access control security (MACsec) communication.

As shown in FIG. 6, example implementation 600 may include a PDU of an example fast heartbeat message. As shown in FIG. 6, the PDU includes a destination address field, source address field, ether type field, PDU type field, length field, secure channel identifier (SCI) field, member identifier field, member number field, and connectivity association key (CAK) name field.

In some implementations, packet processing engine 330 may populate fields of the PDU including fields for the ether type, type, and length. In some implementations, the ether type may indicate the protocol encapsulated in the payload. In this case, the ether type may be an experimental ether type (e.g., an ether type identifier, such as 88B5 or 88B6, may be included in ether type field). In some implementations, the type may be a MACsec heartbeat (MHB) and the type field may be one byte in size, and may indicate that each fast heartbeat message is a message of the fast heartbeat session. In some implementations, the length may be the length of the frame data and the length field may be two bytes in size.

In some implementations, the MKA daemon may populate fields of the PDU (e.g., when establishing the MKA session) including fields for the SCI, member identifier, member number, and CAK name. In some implementations, the SCI may include a six byte MAC address and a two byte port identifier (8 bytes total). In some implementations, the member Identifier may be a 96-bit random value chosen when the MKA session begins (12 bytes). In some implementations, the member number may be a 32-bit random value, which begins at one and increases for each MHB transmitted (4 bytes). In some implementations, the CAK name may be an identifier that identifies a CAK (32 bytes).

As indicated above, FIG. 6 is provided merely as an example. Other examples are possible and may differ from what was described with regard to FIG. 6. For example, more or less fields may be included within the PDU of FIG. 6.

Figure 7:
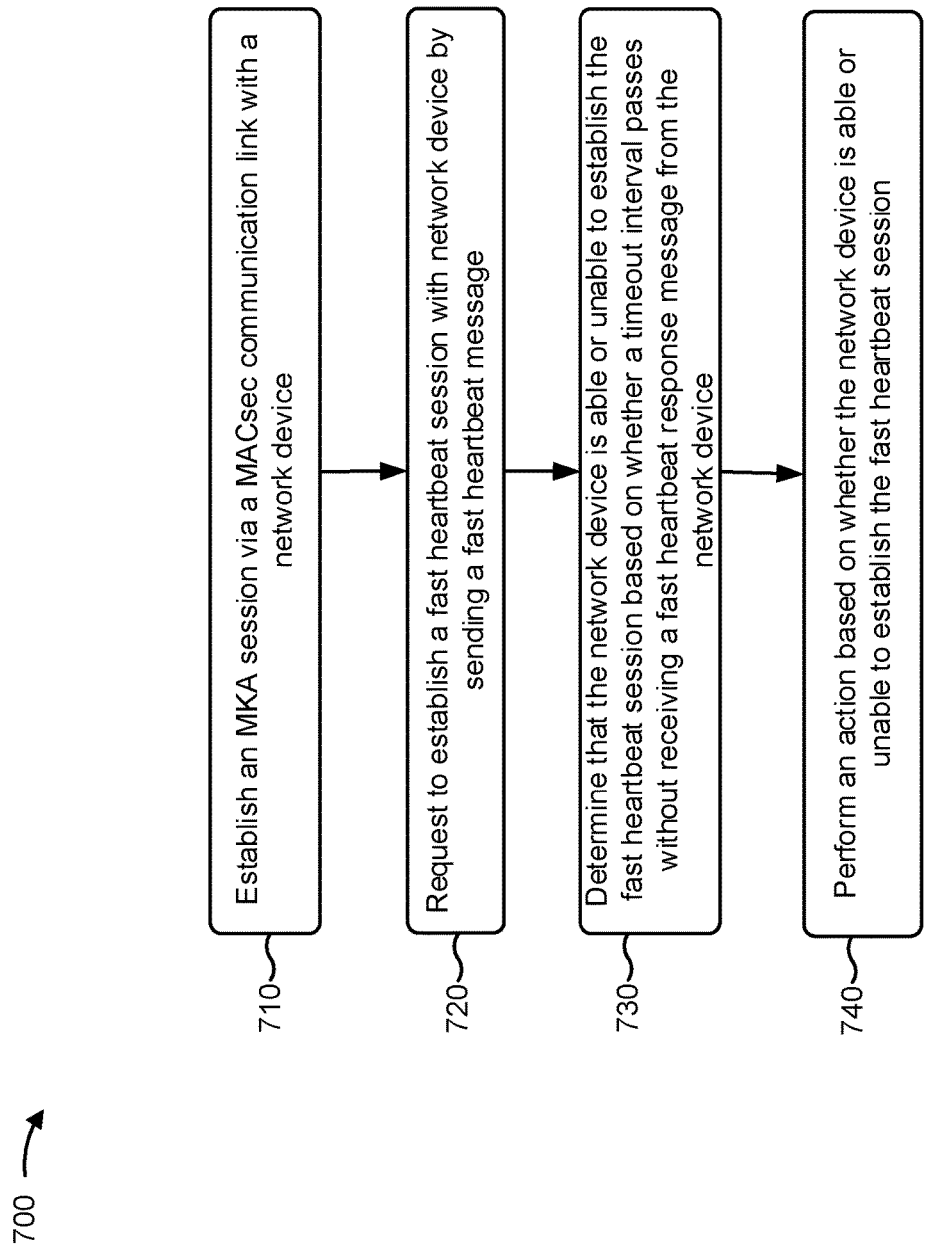
FIG. 7 is a flow chart of another example process for establishing a fast heartbeat session between packet processing engines of network devices using MACsec communication.

FIG. 7 is a flow chart of an example process 700 for establishing a fast heartbeat session between packet processing engines of network devices using media access control security (MACsec) communication. In some implementations, one or more process blocks of FIG. 7 may be performed by network device 210-1. In some implementations, one or more process blocks of FIG. 7 may be performed by another device or a group of devices separate from or including network device 210-1, such as another network device 210-N or another device in communication with network 220.

As shown in FIG. 7, process 700 may include establishing an MKA session via a MACsec communication link with a network device (block 710). For example, network device network device 210-1 may send a request to establish the MKA session with another network device 210-N. In this case, network devices 210 may establish the MKA session using standard MKA communication protocol, as described above.

As further shown in FIG. 7, process 700 may include requesting to establish a fast heartbeat session with network device by sending a fast heartbeat message (block 720). For example, network device 210-1 may send the fast heartbeat message to network device 210-N. In some implementations, network device 210-1 may send the fast heartbeat message to determine whether network device 210-N is capable of establishing a fast heartbeat session.

As further shown in FIG. 7, process 700 may include determining that the network device is able or unable to establish the fast heartbeat session based on whether a timeout interval expires without receiving a fast heartbeat response message from the network device (block 730). For example, network device 210-1 may wait for a response fast heartbeat message from network device 210-N for a period of time (e.g., the length of the fast heartbeat timeout interval) before determining whether a fast heartbeat session can be established. If no fast heartbeat message is received from network device 210-N, then network device 210-1 may determine that network device 210-N is unable to establish a fast heartbeat session (e.g., network device 210-N does not have the capability or functionality to establish a fast heartbeat session). If network device 210-N replies with a fast heartbeat message within the time period of the fast heartbeat timeout interval (before the fast heartbeat timeout interval expires), then network device 210-1 may determine that network device 210-1 is able to establish a fast heartbeat session.

As further shown in FIG. 7, process 700 may include performing an action based on whether the network device is able or unable to establish the fast heartbeat session (block 740). For example, if network device 210-N is able to establish the fast heartbeat session, then network device 210-1 may establish the fast heartbeat session (e.g., by replying with another fast heartbeat message). If network device 210-N is unable to establish the fast heartbeat session, then network device 210-1 may stop sending fast heartbeat messages, may send instructions to cause network device 210-N to obtain functionality to establish fast heartbeat sessions (e.g., provide access to an upgrade or update to the MKA protocol used by network device 210-N), may end the MKA session, notify a network operative of the MKA session ending, cause network device 210-1 and/or network device 210-N to reboot, log information associated with MKA session ending in a log, and/or the like.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Some implementations, described herein, provide a fast heartbeat protocol to be performed during an MKA session between packet processing engines of MKA devices, rather than between MKA daemons at the top of a stack of elements of MKA devices. The fast heartbeat protocol messages may be exchanged between MKA devices at a faster rate than the standard peer liveness messages of MKA sessions (e.g., approximately every half second (0.5 seconds)). Additionally, the fast heartbeat protocol may lessen a period of time for peer liveness messages to reach peer MKA devices as the packet processing engines are located closer to a network interface control (NIC) in the stack of the MKA devices than the MKA daemons. Additionally, or alternatively, a fast heartbeat timeout interval may be implemented to decrease the period of time of the MKA session timeout interval of MKA sessions. In some implementations, the fast heartbeat messages may be transmitted as controlled packets through the secured channels of MACsec (and thus may not need to be encrypted/decrypted), thus ensuring that the secure path is validated and there is no overhead for encrypting frames (unlike standard MKA packet data units (PDUs)).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
  establish a media access control security (MACsec) key agreement (MKA) session between a first network device and a second network device via a MACsec communication link;
  establish a fast heartbeat session via the MACsec communication link, between a first packet processing engine of the first network device and a second packet processing engine of the second network device, to permit the first packet processing engine and the second packet processing engine to exchange fast heartbeat messages via the fast heartbeat session and the MACsec communication link,
    where the fast heartbeat messages are exchanged at a faster rate than MKA packet data of the MKA session;
  determine, based on the fast heartbeat session, that the MKA session has ended; and
  perform an action based on the MKA session ending.

2. The device of claim 1, where the one or more processors, when establishing the fast heartbeat session, are to:
  transmit a request to establish the fast heartbeat session by sending a first fast heartbeat message, of the fast heartbeat messages, from the first packet processing engine to the second packet processing engine; and
  establish the fast heartbeat session after the first packet processing engine receives a second fast heartbeat message from the second packet processing engine.

3. The device of claim 1, where the fast heartbeat messages are exchanged via a secure channel of the MACsec communication link.

4. The device of claim 1, where the one or more processors, when determining that the MKA session has ended, are to:
  determine that the first network device or the second network device has been disconnected from the MKA session based on a fast heartbeat timeout interval expiring without exchanging fast heartbeat messages.

5. The device of claim 1, where each of the fast heartbeat messages includes a type field indicating that the fast heartbeat message is a message of the fast heartbeat session, where the type field is populated by the first packet processing engine or the second packet processing engine.

6. The device of claim 1, where the one or more processors, when performing the action, are to:
reinitiate the MKA session based on the MKA session ending.

7. A non-transitory computer-readable medium storing instructions, the instructions comprising:
one or more instructions that, when executed by one or more processors, cause the one or more processors to:
establish an media access control security (MACsec) key agreement (MKA) session between a first network device and a second network device via a MACsec communication link to send MKA packet data;
establish a fast heartbeat session via the MACsec communication link between a first packet processing engine of the first network device and a second packet processing engine of the second network device to permit the first packet processing engine and the second packet processing engine to exchange fast heartbeat messages via the fast heartbeat session and the MACsec communication link at a faster rate than MKA packet data of the MKA session;
determine, based on the fast heartbeat session, that the first network device or the second network device has been disconnected from the MKA session; and
perform an action based on the determining that the first network device or the second network device has been disconnected from the MKA session.

8. The non-transitory computer-readable medium of claim 7, where the one or more instructions, that cause the one or more processors to establish the fast heartbeat session, cause the one or more processors to:
transmit a request to establish the fast heartbeat session by sending a first fast heartbeat message, of the fast heartbeat messages, from the first packet processing engine to the second packet processing engine;
determine that the second network device is capable of establishing the fast heartbeat session after the first packet processing engine receives a second heartbeat message, of the fast heartbeat messages, from the second packet processing engine; and
establish the fast heartbeat session by sending a third fast heartbeat message of the fast heartbeat messages from the first packet processing engine to the second packet processing engine.

9. The non-transitory computer-readable medium of claim 7, where the first packet processing engine and the second packet processing engine indicate that the fast heartbeat messages are messages of the fast heartbeat session by populating a field of the fast heartbeat messages with particular data identifying the fast heartbeat messages as messages of the fast heartbeat session.

10. The non-transitory computer-readable medium of claim 7, where
the first packet processing engine of the first network device and the second packet processing engine of the second network device populate at least one of:
an ether type field of a fast heartbeat message of the fast heartbeat messages,
a type field of a fast heartbeat message of the fast heartbeat messages, or
a length field of a fast heartbeat message of the fast heartbeat messages, and a first MKA daemon of the first network device and a second MKA daemon of the second network device populate at least one of:
a destination address field of a fast heartbeat message of the fast heartbeat messages,
a source address field of a fast heartbeat message of the fast heartbeat messages,
a secure channel identifier (SCI) field of a fast heartbeat message of the fast heartbeat messages,
a member identifier field of a fast heartbeat message of the fast heartbeat messages,
a member number field of a fast heartbeat message of the fast heartbeat messages, or
a connectivity association key (CAK) name field of a fast heartbeat message of the fast heartbeat messages.

11. The non-transitory computer-readable medium of claim 7, where the fast heartbeat messages are unencrypted and are exchanged via a secure channel of the MACsec communication link.

12. The non-transitory computer-readable medium of claim 7, where the one or more instructions, that cause the one or more processors to determine that the first network device or the second network device has been disconnected from the MKA session, cause the one or more processors to:
determine that a fast heartbeat timeout interval has expired without receiving fast heartbeat messages; and
determine that the first network device or the second network device has been disconnected from the MKA session based on determining that the fast heartbeat timeout interval has expired.

13. The non-transitory computer-readable medium of claim 7, where the one or more instructions, that cause the one or more processors to perform the action, cause the one or more processors to:
reinitiate the MKA session.

14. A method, comprising:
establishing an media access control security (MACsec) key agreement (MKA) session between a first network device and a second network device via a MACsec communication link;
establishing a fast heartbeat session via the MACsec communication link between a first packet processing engine of the first network device and a second packet processing engine of the second network device to permit the first packet processing engine and the second packet processing engine to exchange fast heartbeat messages via the fast heartbeat session and the MACsec communication link,
where the fast heartbeat messages are exchanged at a faster rate between the first packet processing engine and the second packet processing engine than MKA packet data of the MKA session are exchanged between a first MKA daemon of the first network device and a second MKA daemon of the second network device;
determining, based on the fast heartbeat session, that the first network device or the second network device has been disconnected from the MKA session; and
reinitiating an exchange of the MKA packet data via the MKA session based on determining that the first network device or the second network device has been disconnected from the MKA session.

15. The method of claim 14, where establishing the fast heartbeat session comprises:

determining that an MKA timeout interval has expired without receiving MKA packet data via the MKA session; and establishing the fast heartbeat session based on determining that the MKA timeout interval has expired.

16. The method of claim 14, where establishing the fast heartbeat session comprises:

sending a first fast heartbeat message, of the fast heartbeat messages, from the first packet processing engine to the second packet processing engine; and establishing the fast heartbeat session after the first packet processing engine receives a second fast heartbeat message from the second packet processing engine.

17. The method of claim 14, where the first packet processing engine and the second packet processing engine populate at least one field of the fast heartbeat messages.

18. The method of claim 14, where the fast heartbeat messages are exchanged via a secure channel of the MACsec communication link.

19. The device of claim 4, where the fast heartbeat timeout interval is less than a period of time of an MKA timeout interval of the MKA session.

20. The non-transitory computer-readable medium of claim 12, where the fast heartbeat timeout interval is less than a period of time of an MKA timeout interval of the MKA session.

* * * * *